Patented Mar. 14, 1944

2,344,258

UNITED STATES PATENT OFFICE 2,344,258

CONVERSION OF HYDROCARBONS

Francis T. Miles, Anniston, Ala., assignor to Monsanto Chemical Company, a corporation of Delaware No Drawing. Application February 22, 1943, Serial No. 476,770

10 Claims. (Cl. 260—668)

In the commercial synthesis of diphenyl in which benzene is pyrolyzed either in a heated tube or in a lead bath, relatively large quantities of terphenyls are produced simultaneously with diphenyl. The terphenyls have a higher boiling point than diphenyl; hence they are also sometimes referred to as "high boilers."

The terphenyls produced as by-products in the diphenyl synthesis process consist of mixtures of the following hydrocarbons in approximately the percentages indicated:

|  | Boiling points | Percent |
|---|---|---|
|  | Degrees |  |
| Orthodiphenyl benzene | 336 | 10–12 |
| Metadiphenyl benzene | 372 | 53–55 |
| Paradiphenyl benzene | 386 | 29–31 |
| Orthotriphenylene | 425 | 2 |
| Residue |  | 3 |

The residue probably consists of still more highly condensed hydrocarbons and has a considerably higher boiling point than the various diphenylbenzenes shown above. The diphenylbenzenes are referred to herein collectively as "terphenyls." In the commercial synthesis of diphenyl from benzene approximately 20 per cent of the benzene which undergoes pyrolysis appears as high boiler, boiling above 255° C. (which is the boiling point of diphenyl) and as far as the process is concerned such high boiler represents an economic loss of material. Various methods have been proposed for the utilization of the high boiler thus formed; however, no successful methods have as yet been devised for converting the high boiler either into diphenyl or into benzol.

As a result of experimental work, I have now discovered that the high boiling terphenyls may readily be hydrogenated to produce a mixture of diphenyl and benzol without the hydrogenation of the benzene nucleus and without material destructive pyrolysis.

It is, therefore, an object of this invention to provide a method based upon my discovery for commercially converting terphenyls to diphenyls and benzol without the simultaneous production of higher hydrogenation products.

One practical method for carrying out my invention consists of vaporizing the high boiling terphenyls at substantially atmospheric pressures and mixing the vapors thus produced with hydrogen gas in the proportion ranging from one-half mol of hydrogen per mol of terphenyl (diphenylbenzene) to as much as 20 mols of hydrogen per mol of terphenyl. Higher proportions of hydrogen may also be used, however there is no important advantage in using proportions greater than 20 mols per mol of terphenyl. For most purposes, satisfactory results are obtained by proportioning the terphenyl vapor and hydrogen in the mixture to be treated, so that the mixture contains in the neighborhood of four or five mols of hydrogen per mol of terphenyl.

Various methods may be employed for obtaining the mixture of hydrogen and terphenyl. For example, I may pass hydrogen gas through a quantity of boiling terphenyl hydrocarbon by merely bubbling the gas through the hydrocarbon. Or the hydrocarbon may be vaporized by separately boiling it in a boiler and venting the hydrocarbon vapor therefrom into a flowing stream of hydrogen gas. Another method which may be employed is to drop molten terphenyl hydrocarbon in controlled amount upon a heated surface (flash evaporation) in such a manner that the vaporized hydrocarbon is carried off by a stream of hydrogen passing over the heated surface. The surface should be heated above the boiling point of the terphenyls and preferably above about 500° C.

The mixture of hydrocarbon and hydrogen obtained as described above is then passed through a high temperature zone—the temperature of which is maintained between the limits of 650° C. and 850° C. Within these temperature limits, I have found that an appreciable amount of the terphenyl hydrocarbon is decomposed and reacts with hydrogen and forms a mixture of diphenyl and benzene.

The temperature of the heated zone will depend somewhat upon the hydrocarbon-hydrogen ratio employed since I have found that the hydrocarbon mixture is somewhat more stable at high temperature against further condensation or carbon formation due to the presence of large quantities of hydrogen. For example, when the hydrocarbon-hydrogen ratio is as low as ½ mol of hydrogen per mol of terphenyl, the temperature should be maintained in the lower limit of the above range, namely, in the neighborhood of from 650° C. to 750° C. When higher proportions of hydrogen are employed, the temperature may be somewhat higher than that given. In other words, where the hydrogen-high boiler ratio approaches 10–20 mols of hydrogen per mol of terphenyl, the temperature may be in the neighborhood of from 800° C. to 850° C.

The temperature-composition relationships given above should be followed in order to prevent a large formation of carbon by destructive pyrolysis. The mixture of hydrogen and terphenyl vapors should be heated as quickly as practical to the diphenyl-forming temperature and should be maintained at the temperature for a period of time so that substantial equilibrium will have been established. For most purposes, I have found that the exposure of the above described mixture to the heated reaction zone should be so controlled that the time of contact is somewhat greater than 0.1 second and may be as much as 5 seconds.

For the purpose of carrying out my invention, I may heat the terphenyl-hydrogen mixture to a reaction temperature within a heated tube or other vessel as described in Carothers' Reissue Patent No. 20,368, or, I may utilize the apparatus employing molten lead or other inert heated fluid described by Scott in U. S. Patent No. 1,894,283. Pressures employed should be sufficient to cause the gases and vapors to flow through the heated zone.

The reaction producing a high yield of diphenyl and benzol may be permitted to attain substantial equilibrium while in the heated zone, hence, it is unnecessary to rapidly cool the reacted gases. Accordingly, the gases may be cooled in any convenient manner as by passing them into a cooled condenser or by contacting them with a cool condensate.

Upon cooling the gases, the vapors and condensable hydrocarbons form a liquid which by mechanical means may be separated from the excess unreacted hydrogen contained in the vapors. The condensed hydrocarbons are then subjected to distillation and fractionation to recover benzene and diphenyl and to separate these products from unchanged terphenyl.

The unchanged terphenyls which have been separated from the benzene and diphenyl may be again treated according to my process.

When carrying out my process in an apparatus using heated lead such as described by Scott in U. S. Patent No. 1,894,283 I have obtained the results shown in the table below:

| Lead temp., ° C. | Mol ratio H²:terphenyl | Products, per cent of original terphenyl | | |
|---|---|---|---|---|
| | | Benzene | Diphenyl | Terphenyl |
| 750 | 4.6:1 | 4 | 10 | 84 |
| 800 | 1.11:1 | 4 | 11 | 79 |
| 800 | 1.31:1 | 6 | 14 | 66 |
| 800 | 4.5:1 | 9 | 16 | 65 |
| 850 | 1.57:1 | 20 | 22 | 30 |
| 850 | 3.78:1 | 20 | 20 | 40 |
| 850 | 5.0:1 | 26 | 30 | 35 |
| 850 | 5.1:1 | 15 | 21 | 39 |
| 850 | 16.3:1 | 25 | 29 | 23 |
| 850 | 71:1 | 36 | 25 | 21 |
| 900 | 4.1:1 | 44 | 12 | None |

Some carbon is also formed by the process as well as some hydrocarbons more highly condensed than the original terphenyl. The carbon represents a loss, however some of the more highly condensed hydrocarbons mentioned may be again reacted with hydrogen at higher temperatures and part of such hydrocarbons also recovered in the form of benzene and diphenyl.

Using 4 to 5 mols of hydrogen per mol of terphenyl in the feed to the lead bath the yield of benzene expressed as weight per cent of terphenyl fed, is approximately 5% at a lead temperature of 750° C., 9% at 800° C., 26% at 850° C. and 44% at 900° C. The yield of diphenyl expressed in the same manner was 10% at 750° C., 16% at 800° C., 30% at 850° C. and then decreased to 12% at 900° C. From these results it will be seen that the maximum weight yield of diphenyl, under these conditions, namely, 4-5 mols of hydrogen per mol of terphenyl, will be obtained at a temperature in the neighborhood of 850° C. On the other hand the maximum yield of benzene from the reaction is obtained at 900° C.

The weight ratio of diphenyl to benzene produced by the reaction considered as a function of the temperature decreases almost linearly as the temperature increases. At a temperature of 750° C. and employing 4-5 mols of hydrogen per mol of terphenyl, the weight ratio of diphenyl to benzene is approximately 2.4. At a temperature of 800° C. the ratio becomes 1.8, at 850° C. it becomes 1.1 and at 900° C. the ratio becomes 0.25.

Accordingly by varying conditions as described, the diphenyl and benzene content of the product may be to some extent controlled.

What I claim is:

1. The process comprising mixing together hydrogen and terphenyls and subjecting the mixture to reaction at a temperature of from 600° C. to 900° C.

2. The process comprising mixing together hydrogen and terphenyls in the proportions of at least one-half mol of hydrogen per mol of terphenyl and then heating the mixture to a temperature of from 600° C. to 900° C.

3. The process comprising mixing together hydrogen gas and a terphenyl hydrocarbon in the proportions of between one-half and twenty mols of hydrogen per mol of terphenyl and then heating the mixture to a temperature within the range of 600° C. to 900° C.

4. The process defined in claim 3 in which the proportions of hydrogen gas and terphenyl hydrocarbon is in the neighborhood of 4 to 5 mols of hydrogen per mol of terphenyl.

5. The process for producing diphenyl and benzene comprising mixing hydrogen gas and terphenyl in the proportions of from one-half mol to twenty mols of hydrogen per mol of terphenyl and heating the mixture by contact with molten lead heated to a temperature between 600° C. and 900° C. then cooling the mixture, and recovering diphenyl and hydrogen therefrom.

6. The process defined in claim 5 in which the temperature is maintained between about 800° C. and 850° C.

7. The process for producing diphenyl and benzol comprising vaporizing terphenyls by bringing the same into contact with a heated surface in an atmosphere of hydrogen to produce a mixture of terphenyl vapor and hydrogen gas, then passing the mixture into and through a body of molten lead maintained at a temperature between 750° C. and 900° C., and producing thereby a mixture comprising the vapors of diphenyl, benzene and terphenyl, and recovering diphenyl and benzene from said vapors.

8. The process defined in claim 7, in which the mixture of terphenyl vapors and hydrogen consists of from 1 to 20 mols of hydrogen per mol of terphenyl.

9. The process for producing diphenyl and benzol comprising, vaporizing terphenyl hydrocarbons in an atmosphere of hydrogen gas to produce a gaseous mixture containing more than one mol and less than 20 mols of hydrogen per mol of terphenyl, heating said gaseous mixture to a temperature between 600° C. and 900° C. and maintaining said mixture at said temperature for a period of from 0.1 and 5.0 seconds; cooling said heated mixture to condense contained hydrocarbons, and then separating said contained hydrocarbons into a diphenyl fraction an da benzol fraction.

10. The process defined in claim 9, in which the gaseous mixture contains between 4 and 5 mols of hydrogen per mol of terphenyl.

FRANCIS T. MILES.